(12) United States Patent
Shibuya et al.

(10) Patent No.: US 11,262,372 B2
(45) Date of Patent: Mar. 1, 2022

(54) AUTOMATED ANALYSIS SYSTEM

(71) Applicant: Hitachi High-Technologies Corporation, Tokyo (JP)

(72) Inventors: Satoshi Shibuya, Tokyo (JP); Toshihide Hanawa, Tokyo (JP); Mikio Kasama, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 306 days.

(21) Appl. No.: 16/493,940

(22) PCT Filed: Feb. 27, 2018

(86) PCT No.: PCT/JP2018/007115
§ 371 (c)(1),
(2) Date: Sep. 13, 2019

(87) PCT Pub. No.: WO2018/168431
PCT Pub. Date: Sep. 20, 2018

(65) Prior Publication Data
US 2021/0123935 A1    Apr. 29, 2021

(30) Foreign Application Priority Data

Mar. 14, 2017    (JP) .............................. JP2017-048264

(51) Int. Cl.
*G01N 35/00*    (2006.01)
*G01N 35/02*    (2006.01)
*G01N 35/10*    (2006.01)

(52) U.S. Cl.
CPC ....... *G01N 35/025* (2013.01); *G01N 35/0092* (2013.01); *G01N 35/00732* (2013.01); *G01N 35/1002* (2013.01)

(58) Field of Classification Search
CPC ......... G01N 2035/009; G01N 35/0092; G01N 2035/0091; G01N 35/00712;
(Continued)

(56) References Cited

U.S. PATENT DOCUMENTS 9,927,941 B2 *   3/2018   Steimle .................... G06F 3/048
2006/0148063 A1 *   7/2006   Fauzzi ............. G01N 35/00871
435/286.4
(Continued)

FOREIGN PATENT DOCUMENTS

JP    2006-275951 A    10/2006
JP    2013-187737 A    9/2013
(Continued)

OTHER PUBLICATIONS

International Search Report (PCT/ISA/210) issued in PCT Application No. PCT/JP2018/007115 dated Apr. 24, 2018 with English translation (four (4) pages).
(Continued)

*Primary Examiner* — Shogo Sasaki
(74) *Attorney, Agent, or Firm* — Crowell & Moring LLP (57) ABSTRACT

Work, such as status confirmation, in a plurality of automatic analyzers is efficiently performed. In an automated analysis system, a tablet terminal 114 has a terminal information management unit 210 and a terminal display unit 208. A terminal information management unit 210 acquires device information showing the state status of a device from automatic analyzers 101*a* to 101*d*, and generates a status confirmation screen showing the device status of the automatic analyzer. A terminal display unit 208 displays the status confirmation screen. The status confirmation screen has a status information screen showing the device status of one automatic analyzer and a device switch button configured to switch the status information screen to a status
(Continued)

information screen corresponding to another other automatic analyzer. When the switch button is selected, the terminal information management unit 210 generates a status confirmation screen for an automatic analyzer corresponding to the selected switch button, and displays the status confirmation screen on the display unit.

8 Claims, 9 Drawing Sheets

(58) Field of Classification Search
CPC ........... G01N 35/00732; G01N 35/025; G01N 35/1002; G01N 2035/00881; G01N 35/00871

See application file for complete search history.

(56) References Cited

U.S. PATENT DOCUMENTS

| 2007/0266136 A1* | 11/2007 | Esfahany | H04L 41/022 |
| | | | 709/223 |
| 2009/0164895 A1* | 6/2009 | Baeza-Yates | G06F 16/9535 |
| | | | 715/700 |
| 2009/0259493 A1* | 10/2009 | Venon | G06Q 10/10 |
| | | | 705/3 |
| 2011/0126123 A1* | 5/2011 | Reter | G06Q 10/109 |
| | | | 715/751 |
| 2013/0145299 A1 | 6/2013 | Steimle et al. | |

FOREIGN PATENT DOCUMENTS

| JP | 2014-44046 A | 3/2014 |
| JP | 2015-92195 A | 5/2015 |

OTHER PUBLICATIONS

Japanese-language Written Opinion (PCT/ISA/237) issued in PCT Application No. PCT/JP2018/007115 dated Apr. 24, 2018 (five (5) pages).

Introduction of New Product LAbOSPECT mobile, Journal of Hitachi automatic analysis Lab Scope, 2016 Autumn, vol. 53, 2016, pp. 8-9 (five (5) pages).

* cited by examiner

AUTOMATED ANALYSIS SYSTEM

TECHNICAL FIELD

The present invention relates to an automated analysis system, and more specifically to a technique that is effective to confirm the status of a plurality of analyzers.

BACKGROUND ART

As a device that performs the qualitative and quantitative analysis of biological samples, such as blood and urine, (in the following, simply referred to as a sample), an automatic analyzer is widely known. The automatic analyzer is provided with an operation unit.

The operation unit executes analysis and maintenance, and confirms the result of the execution, displays the unique information or remaining amount information of a reagent, or notifies an abnormality that occurs on a device by alarm, for example.

For the operation unit, a desktop personal computer (in the following, simply referred to as a desktop PC) is mainly used. In some cases, a tablet terminal, for example, is sometimes used, other than the desktop PC attached to the device.

The tablet terminal is connected to an automatic analyzer via a wireless network, for example, and displays the information, for example, of the automatic analyzer.

Nowadays, as for the content displayed on the desktop PC screen, information volumes displayed on the screen are increasing in association with the multifunction and sophistication of the automatic analyzer, and the screen hierarchy also becomes complicated. These tend to be the same tendency even in the case in which the content is displayed on the desktop PC and in the case in which the content is displayed on the tablet terminal.

On the other hand, when attention is paid to inspection operations, in addition to an increase in the amount of automatic analysis processing and a prompt response to an emergency sample, routine operations become tight due to the influence of a reduction in workforce, for example.

Moreover, the facilities that use a system having a plurality of automatic analyzers disposed on the same network are increasing. However, since personnel is limited, one operator virtually takes charge of operating a plurality of devices.

Note that as for a technique that efficiently manages a system having a plurality of automatic analyzers disposed on the same network, Patent Literature 1, for example, is known.

CITATION LIST

Patent Literature

PTL 1: JP-A-2006-275951

SUMMARY OF INVENTION

Technical Problem

As described above, the tighter routine operation schedules become, naturally, the more increasing the work load per operator is. In order to perform specimen analysis as scheduled, the preparation of reagents or a response to alarms, for example, has to be quickly performed.

For example, in the case in which four automatic analyzers are installed, in the preparation of reagents, the operator has to approach the desktop PC connected to each automatic analyzer and sequentially confirm the reagent installation status and the remaining amount, for example, lading to a problem of working efficiency degradation.

Even in the case in which reagent information is confirmed using the tablet terminal, a problem of working efficiency degradation similarly arises. In the configuration of the management screen displayed on the tablet terminal, the screen is configured for each automatic analyzer. Therefore, there is a necessity that the automatic analyzer to be confirmed is selected from the management screen each time and then the screen has to transition to the target reagent status screen while the screen hierarchy of the selected automatic analyzer is sequentially followed.

An object of the present invention is to provide a technique that can efficiently perform work, such as status confirmation, in a plurality of automatic analyzers.

The object and other objects and novel characteristics according to the present invention will be apparent from the description of the present specification and the accompanying drawings.

Solution to Problem

In the inventions disclosed in the present application, the following is the brief description of representative ones.

That is, a representative automated analysis system has a plurality of automatic analyzers configured to measure a specimen and a terminal device connected to the plurality of automatic analyzers.

The terminal device has an information management unit and a display unit. The information management unit acquires device information showing the state status of the automatic analyzer from the plurality of automatic analyzers and generates a status confirmation screen showing the device status of the automatic analyzer based on the acquired device information. The display unit displays the status confirmation screen generated by the information management unit.

The status confirmation screen displayed on the display unit has a status information screen showing device status of one automatic analyzer of the plurality of automatic analyzers, and a switch button configured to switch the status information screen to a status information screen corresponding to another automatic analyzer.

When the switch button is selected, the information management unit generates a status confirmation screen showing the device status of the automatic analyzer based on the device information on an automatic analyzer corresponding to the selected switch button, and displays the status confirmation screen on the display unit.

More specifically, the switch button displayed on the display unit is displayed corresponding to each of the plurality of automatic analyzers.

Advantageous Effects of Invention

In the inventions disclosed in the present application, the brief description of the effects obtained by the representative ones is as follows.

(1) The number of man-hours in the confirmation of the status of the automatic analyzer can be reduced.

(2) From the effect (1), the working efficiency can be improved.

DESCRIPTION OF EMBODIMENTS

In the entire drawings for explaining an embodiment, the same members are designated with the same reference signs in principle, and the duplicated description is omitted.

In the following, an embodiment will be described in detail.

Exemplary Configuration 1 of Automated Analysis System

Figure 1:
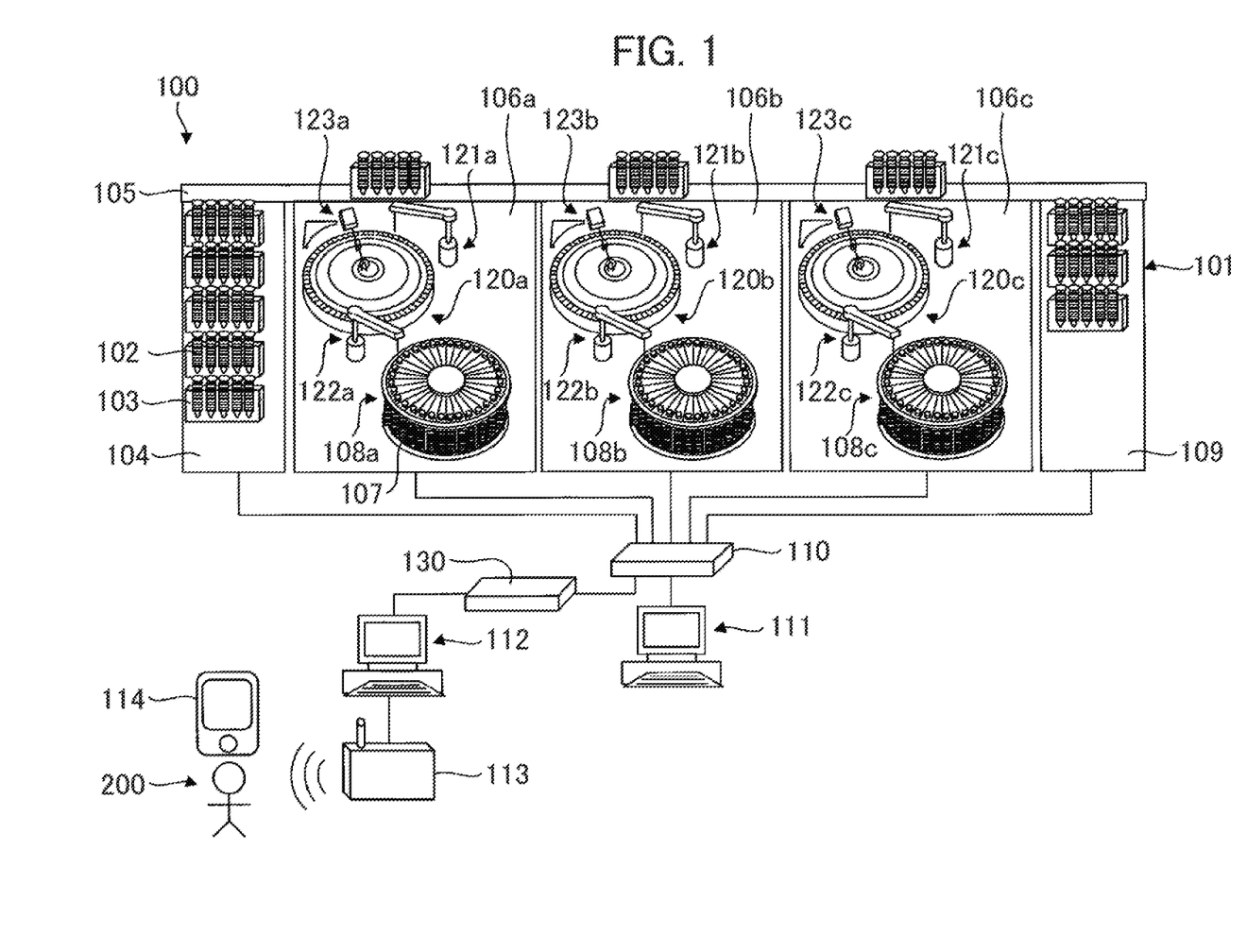
FIG. 1 is an illustration showing an exemplary configuration of an automated analysis system according to an embodiment.

FIG. 1 is an illustration showing an exemplary configuration of an automated analysis system according to an embodiment.

In the automated analysis system shown in FIG. 1, the overall structure having one automatic analyzer is schematically shown.

As shown in FIG. 1, an automated analysis system 100 has an automatic analyzer 101, a communication device 110, an operation unit PC 111, an information management PC 112, a wireless device 113, and a communication device 130.

The automatic analyzer 101 has a sample input unit 104, analysis units 106a, 106b, and 106c, a transfer line 105, and a sample housing unit 109, for example. The automatic analyzer 101 is connected to an operation unit PC 111 and a tablet terminal 114 via a network connection, for example.

The sample input unit 104 is connected to the sample housing unit 109 through the transfer line 105 through which a sample rack 103 is transferred. Into the sample input unit 104, the sample rack 103 is inputted. The sample rack 103 is mounted with a plurality of sample containers 102 housed with a sample that is an analysis target. The sample housing unit 109 houses the sample rack 103.

The analysis units 106a, 106b, and 106c are disposed along the transfer line 105. Note that in FIG. 1, an example is shown in which three analysis units 106a, 106b, and 106c are disposed. However, the number of analysis units is non-limiting, and one analysis unit or more are fine.

The operation unit PC 111 is a PC that controls the entire operation of the automatic analyzer 101, and connected to the automatic analyzer 101 through the communication device 110 formed of a hub, for example. To the communication device 110, the information management PC 112, a personal computer, for example, is connected. To the information management PC 112, the wireless device 113, a wireless router, for example, is connected, and the information management PC 112 can communicate with the tablet terminal 114 via wireless communications by the wireless device 113.

Into the sample input unit 104, the sample rack 103, on which a plurality of sample containers 102 housed with a sample that is an analysis target is disposed, is inputted, and the sample rack 103 is transferred to the analysis units 106a, 106b, and 106c and the sample housing unit 109, for example, through the transfer line 105.

Samples housed in the sample container 102 include calibration samples used for calibration measurement, accuracy management samples used for accuracy management measurement, patient samples that are biological samples, such as blood and urine, or any other samples.

The sample containers 102 mounted on the sample rack 103 are each provided with a tag, not shown, that identifies the housed sample. This tag is a barcode or RFID (Radio Frequency IDentification), and identification information is read by a reader, not shown, and sent to the operation unit PC 111, for example.

The analysis unit 106a has a reaction disk 120a, a sample dispensing mechanism 121a, a reagent disk 108a, a reagent dispensing mechanism 122a, and a photometric mechanism 123a, for example. The reaction disk 120a has a plurality of reaction chambers.

The sample dispensing mechanism 121a dispenses, into the reaction chamber, a sample housed in the sample container 102 transferred by the transfer line 105. The reagent disk 108a is installed with a plurality of reagent containers 107 in which a reagent used for analysis of the sample is housed.

The reagent dispensing mechanism 122a sucks the reagent in the reagent container 107 installed on the reagent disk, and dispenses the reagent into the reaction chamber. The photometric mechanism 123a measures the absorbance or the scattered light intensity, for example, of the mixed solution of the sample and the reagent housed in the reaction chamber.

The analysis unit 106a can analyze the concentration of the content of a predetermined substance in the sample, for example, by analyzing optical information obtained from the photometric mechanism 123a. The analysis units 106b and 106c also have the configuration similar to the configuration of the analysis unit 106a. The analysis units 106b and 106c respectively have reaction disks 120b and 120c, sample dispensing mechanisms 121b and 121c, reagent disks 108b and 108c, reagent dispensing mechanisms 122b and 122c, and photometric mechanisms 123b and 123c, and any other units.

The tablet terminal 114 that is a terminal device is communicatably connected to the information management PC 112 through the wireless device 113, and acquires device information from the operation unit PC 111 via the information management PC 112 by an instruction from the tablet terminal 114. Thus, an operator 200 can see the pieces of information of the automatic analyzer 101 from the screen of the tablet terminal.

Exemplary Configuration 2 of the Automated Analysis System

Figure 2:
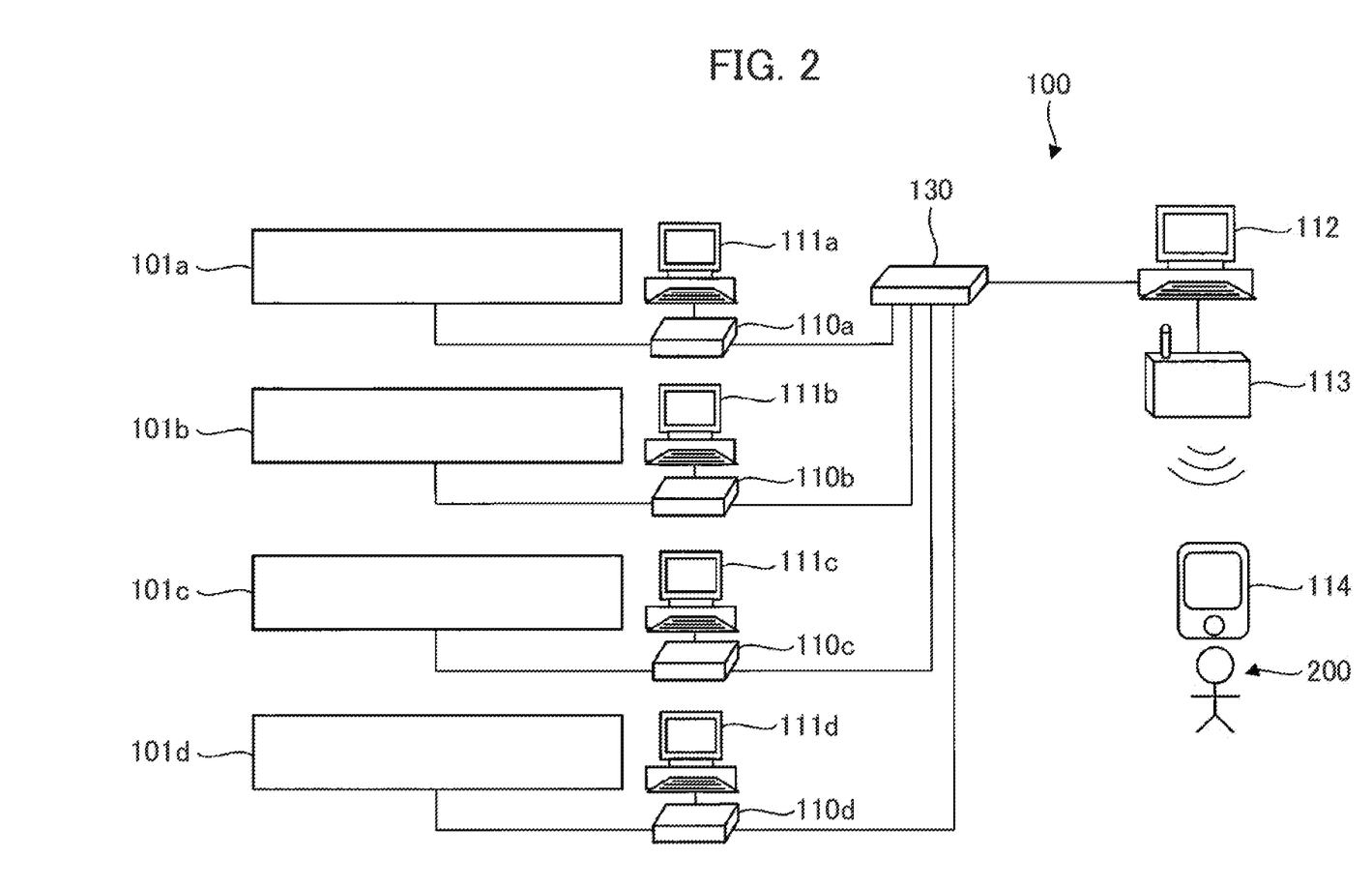
FIG. 2 is an illustration showing an exemplary configuration of the automated analysis system having a plurality of automatic analyzers in FIG. 1.

FIG. 2 is an illustration showing an exemplary configuration of the automated analysis system having a plurality of automatic analyzers in FIG. 1.

FIG. 2 shows an example in which four automatic analyzers 101a to 101d are connected, to each of which the operation unit PC 111 is connected. Note that the number of connected automatic analyzers is not limited specifically.

To the automatic analyzers 101a to 101d, communication devices 110a to 110d, formed of a hub, for example, are connected. The communication devices 110a to 110d are connected to the communication device 130.

Thus, the automatic analyzers 101a to 101d are connected to the information management PC 112 through the communication devices 110a to 110d and the communication device 130. The information management PC 112 is communicatably connected to the tablet terminal 114 via wireless communications through the connected wireless device 113.

Exemplary Transition 1 of Status Screens

Figure 3:
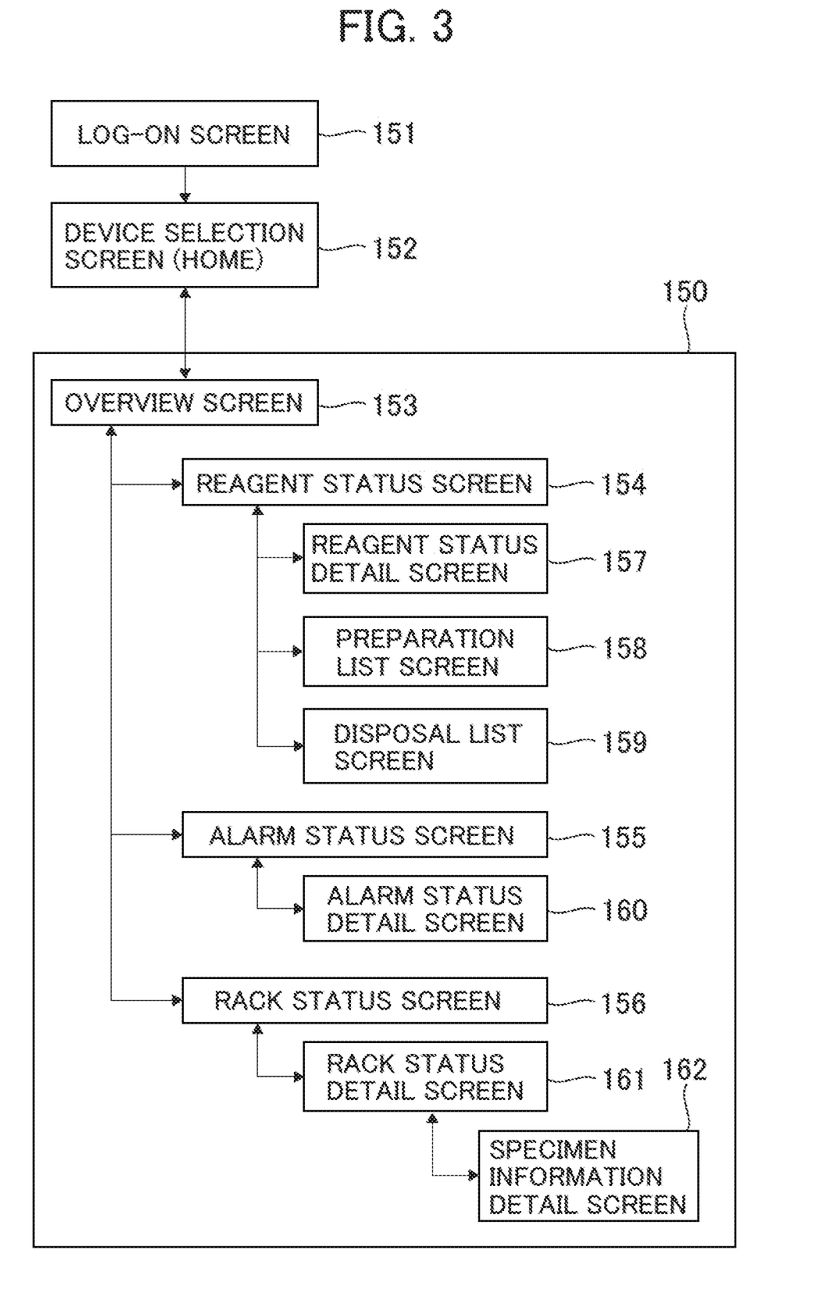
FIG. 3 is an illustration schematically showing an exemplary screen hierarchy and an exemplary screen transition displayed on the tablet terminal of the automated analysis system in FIG. 2.

FIG. 3 is an illustration schematically showing an exemplary screen hierarchy and an exemplary screen transition displayed on the tablet terminal of the automated analysis system in FIG. 2.

As shown in FIG. 3, screens displayed on the tablet terminal 114 are a log-on screen 151, a device selection screen 152, an overview screen 153, a reagent status screen 154, an alarm status screen 155, a rack status screen 156, a reagent status detail screen 157, a preparation list screen 158, a disposal list screen 159, an alarm status detail screen 160, a rack status detail screen 161, and a specimen information detail screen 162.

The reagent status screen 154, the alarm status screen 155, and the rack status screen 156 are a first sort display. The reagent status detail screen 157, the preparation list screen 158, and the disposal list screen 159 on the reagent status screen 154 are a second sort display.

Similarly, the alarm status detail screen 160 on the alarm status screen 155 is the second sort display, and the rack status detail screen 161 and the specimen information detail screen 162 on the rack status screen 156 are also the second sort display.

Here, a screen configuration 150 shows screen elements that display information on the automatic analyzer selected by a device select button on the device selection screen 152.

The log-on screen 151 is the screen of the top-level layer, and has the device selection screen 152 on the second layer. The third layer that is the layer below the second layer has the overview screen 153. The fourth layer that is the layer below the overview screen 153 shows that the reagent status screen 154, the alarm status screen 155, and the rack status screen 156 are included.

As the fifth layer that is the layer below the fourth layer, the reagent status screen 154 has the reagent status detail screen 157, the preparation list screen 158, and the disposal list screen 159. Similarly, the alarm status screen 155 has the alarm status detail screen 160, and the rack status screen 156 has the rack status detail screen 161. As the sixth layer, the rack status detail screen 161 has the specimen information detail screen 162.

Note that in FIG. 3, arrow lines connecting the screens indicate the direction of screen transition. For example, the reagent status detail screen 157 can transition from the reagent status screen 154 as well as can return to the reagent status screen 154. The reagent status screen 154 shows that the reagent status screen 154 can return to the overview screen 153 as well as can also transition to the alarm status screen 155.

Exemplary Functional Configurations

Figure 4:
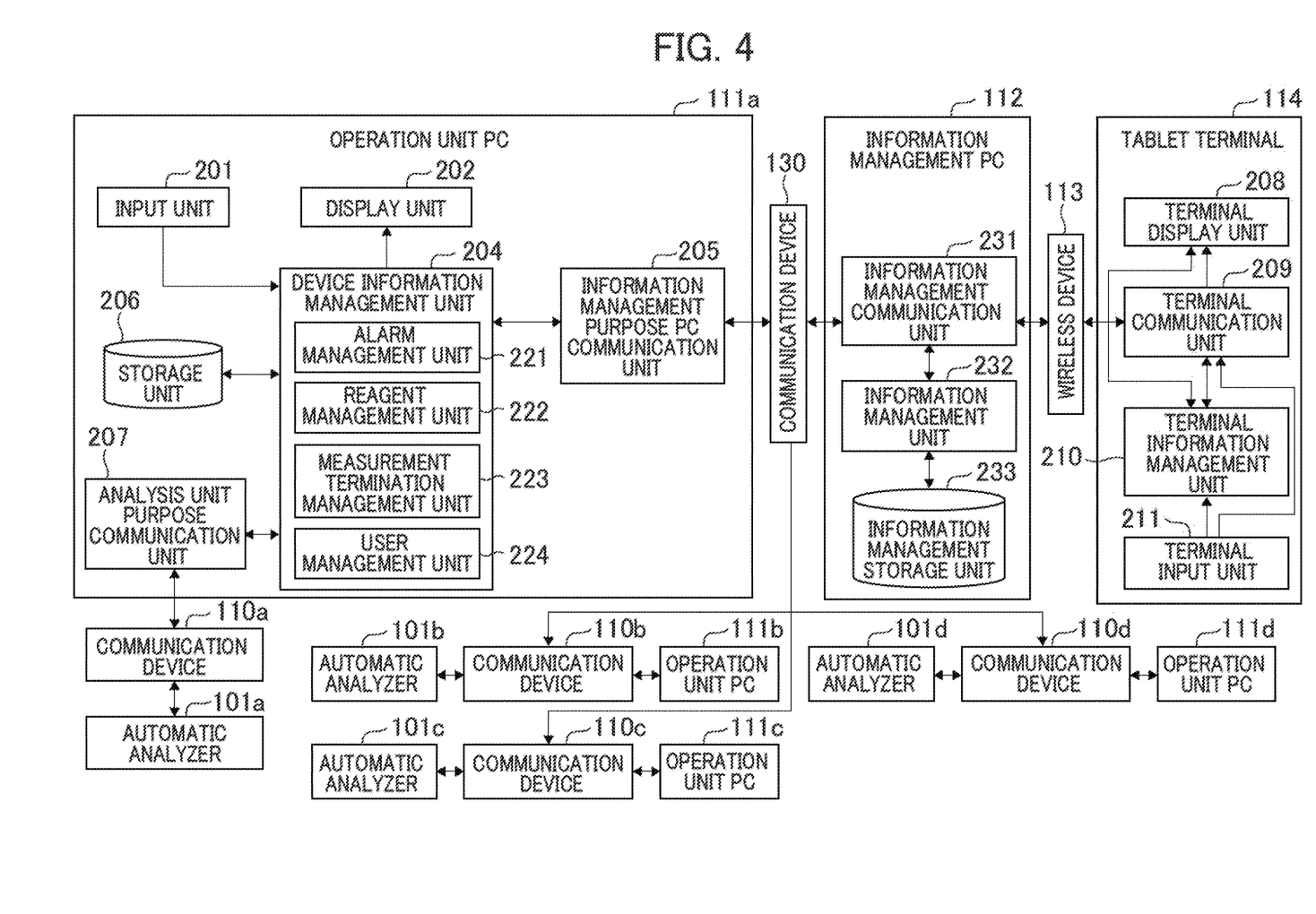
FIG. 4 is a block diagram showing exemplary functional configurations of the operation unit PC, the information management PC, and the tablet terminal of the automated analysis system in FIG. 2.

FIG. 4 is a block diagram showing exemplary functional configurations of the operation unit PC, the information management PC, and the tablet terminal of the automated analysis system in FIG. 2.

In FIG. 4, the connection configuration in the automated analysis system 100 is similar to FIG. 2, and the operation unit PCs 111a, 111b, 111c, and 111d are connected to the information management PC 112 through the communication devices 110a, 110b, 110c, and 110d, respectively, and the communication device 130. The information management PC 112 swaps information via wireless communications through the wireless device 113.

Note that since the operation unit PCs 111b to 111d have the functional configuration similar to the operation unit PC 111a, the operation unit PCs 111b to 111d are omitted in FIG. 4.

As shown in the drawing, the operation unit PC 111a has an input unit 201, a display unit 202, a device information management unit 204, an information management purpose PC communication unit 205, a storage unit 206, an analysis unit purpose communication unit 207, and any other units.

The operation unit PC 111a communicates with the analysis units 106a, 106b, and 106c, the sample housing unit 109, and any other units, in FIG. 1, for example, and controls the entire operation of the automatic analyzer 101a. The operation unit PC 111a has the input unit 201, the display unit 202, the device information management unit 204, the information management purpose PC communication unit 205, the storage unit 206, the analysis unit purpose communication unit 207, and any other units.

The input unit 201 is a keyboard, a mouse, and any other devices, for example, and performs pressing down button indications on the various operation screens displayed on the display unit 202 with the mouse cursor, clicks with the mouse, for example, and inputs of numerical characters and text from the keyboard to the input frame, for example. That is, the input unit 201 and the display unit 202 are configured of GUIs (Graphical User Interfaces).

The device information management unit 204 has an alarm management unit 221, a reagent management unit 222, a measurement termination management unit 223, and a user management unit 224.

The reagent management unit 222 manages information relating to reagents in the reagent containers 107, for example, installed on the reagent disks 108a, 108b, and 108c in FIG. 1. Specifically, the reagent management unit 222 performs ties with analysis items, remaining amount management, use priority management in the case in which a plurality of reagent containers 107 is installed on one analysis item, and reagent expiration date management, for example.

In the case in which a new reagent container 107 is installed, the reagent management unit 222 searches accumulated reagent information stored on the storage unit 206, and determines whether the same reagent container has been installed in the past. In the case in which the same reagent container has been installed, the reagent management unit 222 fetches reagent information stored on the storage unit 206, whereas in the case in which the same reagent container has not been installed, the reagent management unit 222 manages the reagent container 107 as a new one.

In remaining amount management, the reagent management unit 222 also performs processes, such as a process of registering the reagent, whose the remaining amount of each analysis item set through the input unit 201 is below the threshold, on a reagent preparation list or on a reagent disposal list. The reagent management unit 222 also performs control on the display of the display unit 202, for example.

The alarm management unit 221 sends a notice, to the display unit 202, information or the device state, for example, from a detecting unit, not shown, provided on the automatic analyzer 101a, or an abnormality detected based on predetermined criteria, such as an abnormality detection theory, and stores abnormality information on a temporary storage unit, not shown, in order to notify an abnormality to the tablet terminal 114.

The measurement termination management unit 223 monitors whether the measurement result of the calibration sample, the accuracy management sample, or the patient sample measured at the automatic analyzer 101a is outputted. After the measurement result is outputted from the automatic analyzer 101a, the measurement termination management unit 223 stores measurement termination information on sample information on the storage unit 206 in order to notify the tablet terminal 114 of the result.

The user management unit 224 manages unique information of the automatic analyzer 101a and user information on an operator who uses the device, for example. For example, the management is writing and reading a login ID or a password, or login determination, and the like.

The information management purpose PC communication unit 205 receives and sends request text from the information management PC 112, and necessary information, such as information managed by the device information management unit 204 to the information management PC 112.

The information management PC 112 has an information management communication unit 231, an information management unit 232, and an information management storage unit 233.

The information management communication unit 231 controls wireless communications with the tablet terminal 114, creates communication text to be sent to the tablet terminal 114, and distributes the information of communication text received from the tablet terminal 114, and sends information to the operation unit PC 111a.

The information management unit 232 stores device identification information, such as the IP addresses of the connected automatic analyzers 101a to 101d on the information management storage unit 233. In response to the content instructed from the tablet terminal 114, the information management unit 232 performs communication, such as acquiring device information on the corresponding automatic analyzer through the information management communication unit 231.

The analysis unit purpose communication unit 207 controls communication with the automatic analyzer 101a, creates communication text to be sent to the automatic analyzer 101a, and distributes the information of communication text received from the automatic analyzer 101a.

The tablet terminal 114 has a terminal display unit 208, a terminal communication unit 209, a terminal information management unit 210, and a terminal input unit 211, and any other units. The tablet terminal 114 communicated with the operation unit PC 111a (to 111d) through the wireless device 113 via the intonation management PC 112. Thus, the tablet terminal 114 acquires various items of information from the automatic analyzer 101a (to 101d), or operates the automatic analyzer 101a (to 101d).

Similarly to the operation unit PC 111a, in the tablet terminal 114, the GUI is configured of the terminal display unit 208 and the terminal input unit 211. Thus, the tablet terminal 114 receives various items of information including reagent information sent from the operation unit PC 111a (to 111d), alarm information, and notification information, and displays these items of information on the terminal display unit 208. Alternatively, the tablet terminal 114 inputs operation instructions, for example, to the automatic analyzer 101a (to 101d) through the terminal input unit 211, and sends the operation instructions to the operation unit PC 111a.

The terminal communication unit 209 controls wireless communications with the information management PC 112, creates communication text to be sent to the information management PC 112, and distributes the information of communication text received from the information management PC 112, for example.

The terminal information management unit 210 that is an information management unit manages information including alarm information relating to the automatic analyzer received from the operation unit PC 111a (to 111d) through the information management PC 112, reagent information, and any other information and operation processes on the screen from the terminal input unit 211, for example.

Exemplary Operation of the Automated Analysis System

Subsequently, the operation of the automated analysis system 100 will be described.

Here, the switching operation of the automatic analyzer will be described using a block diagram in FIG. 4.

The automatic analyzer 101a has a unique device ID and a device name, for example, as the information of the automatic analyzer 101a. First, by starting up the operation unit PC 111a, the user management unit 224 reads the device ID and the device name stored on the storage unit 206.

The read device ID and the read device name are sent to the information management communication unit 231 of the information management PC 112 through the information management purpose PC communication unit 205. The device ID and the device name received at the information management communication unit 231 are delivered to the information management unit 232.

The information management unit 232 stores the device ID and the device name on the information management storage unit 233. The device ID and the device name are used as information for recognizing the automatic analyzer that is connectable.

Similarly, also in the operation unit PCs 111b, 111c, and 111d, by starting up the operation unit PCs 111b, 111c, and 111d, the device IDs and the devices name of all the operation unit PCs 111b, 111c, and 111d, are stored on the information management storage unit 233.

On the other hand, in the first connection to the information management PC 112, the terminal information management unit 210 of the tablet terminal 114 sends a from the terminal communication unit 209 to the information management communication unit 231 of the information management PC 112 in order to acquire the device IDs and device names of the operation unit PCs 111a to 111d.

Processing to the system information acquiring request received at the information management communication unit 231 is performed at the information management unit 232. The information management unit 232 reads the device IDs and device names of all the automatic analyzers from the information management storage unit 233, and sends the read information as reply information to the system information acquiring request from the information management communication unit 231 to the terminal communication unit 209.

The device IDs and the device names received at the terminal communication unit 209 are stored on the terminal information management unit 210. In the example of the tablet terminal 114 in FIG. 4, although the storage place of the terminal information management unit 210 is not shown, the storage may be the hard disk drive of the tablet terminal 114 or a memory, such as a RAM (Random Access Memory), for example.

The terminal display unit 208 is provided with a plurality of screens, such as a screen on which alarm information is displayed (in the following, simply referred to as an alarm information screen), a screen on which reagent information is displayed (in the following, simply referred to as a reagent status screen), or a screen on which specimen measurement information is displayed (in the following, simply referred to as a specimen information screen). These screens individually have unique screen IDs, and the unique screen IDs are stored on the terminal information management unit 210 when the screens are displayed.

In the initial display of the tablet terminal 114, the terminal information management unit 210 reads the device IDs and device names of all the automatic analyzers together with a display request for the device selection screen, and delivers the information to the terminal display unit 208.

The terminal display unit 208 displays the log-on screen as the initial display. After a user inputs the login ID and the password, the device selection screen for determining the automatic analyzer to be connected is displayed.

In the device selection screen, the device select button for the automatic analyzer to be connected is disposed. On each of the device select buttons, the device name is displayed. The device select buttons are managed paired with the device IDs on the tablet terminal 114.

Upon pressing the device select button of the device selection screen, the terminal input unit 211 reports the device ID corresponding to the pressed device select button to the terminal information management unit 210.

The terminal information management unit 210 stores the reported device ID as an in-selection device ID. The in-selection device ID is used for identifying whether the tablet terminal 114 is connected to which device.

After the device select button of the device selection screen is pressed, the overview screen is displayed on the terminal display unit 208. After that, the user displays a main base screen, such as the alarm information screen, the reagent status screen, or the specimen information screen, for work.

On the alarm information screen, the reagent status screen, or the specimen information screen, for example, that is displayed on the terminal display unit 208, a device switch button that is a switch button is displayed. On the device switch button, the device name is displayed. The device switch button is managed paired with the device ID on the tablet terminal 114.

The pressed device switch button is displayed distinguishing from the device switch button for the device that is not selected. The distinguishing method is performed by the differences in button colors, for example. Alternatively, the method may be differences in the size of the characters of the device name, or may be the presence or absence of a check mark, for example.

In the following, the case is described in which in the tablet terminal 114, the device switch button for the operation unit PC 111a is pressed under the situations in which the reagent status screen for the operation unit PC 111b is displayed.

After pressing the device switch button for the operation unit PC 111a displayed in the reagent status screen, the device ID for the operation unit PC 111a is reported from the terminal input unit 211 to the terminal information management unit 210. The terminal information management unit 210 overwrites and stores the reported device ID on the in-selection device ID.

The terminal information management unit 210 makes a screen display information acquiring request to the terminal communication unit 209. The terminal communication unit 209 sends the screen display information acquiring request to the information management communication unit 231.

As the key information of the screen display information acquiring request, the in-selection device ID and the in-selection screen ID are sent. Specifically, the in-selection device ID is the operation unit PC 111a, and the in-selection screen ID indicates the reagent status screen.

Upon receiving the screen display information acquiring request, the information management communication unit 231 sends a report to the information management unit 232. Upon receiving the in-selection device ID and the in-selection screen ID sent in the screen display information acquiring request, the information management unit 232 determines the operation unit PC of the automatic analyzer that is the information acquisition destination from the in-selection device ID, and determines the type of information to be acquired from the operation unit PC using the in-selection screen ID.

The information management unit 232 sends a reagent status screen information acquiring request to the information management purpose PC communication unit 205 of the operation unit PC 111a through the information management communication unit 231. The information management purpose PC communication unit 205 delivers the received reagent status screen information acquiring request to the reagent management unit 222 of the device information management unit 204.

In response to the reagent status screen information acquiring request, the reagent management unit 222 reads reagent information out of the storage unit 206, and sends reagent status screen information as reply information that is the reagent status screen information acquiring request from the information management purpose PC communication unit 205 to the information management communication unit 231.

After the information management communication unit 231 receives the reagent status screen information, the information management unit 232 sends reagent status screen information to the terminal communication unit 209 of the tablet terminal 114. The terminal communication unit 209 delivers the received reagent status screen information to the terminal display unit 208.

The terminal display unit 208 displays the reagent status screen for the operation unit PC 111a according to the delivered reagent status screen information.

Exemplary Transition 2 of the Status Screen

Figure 5:
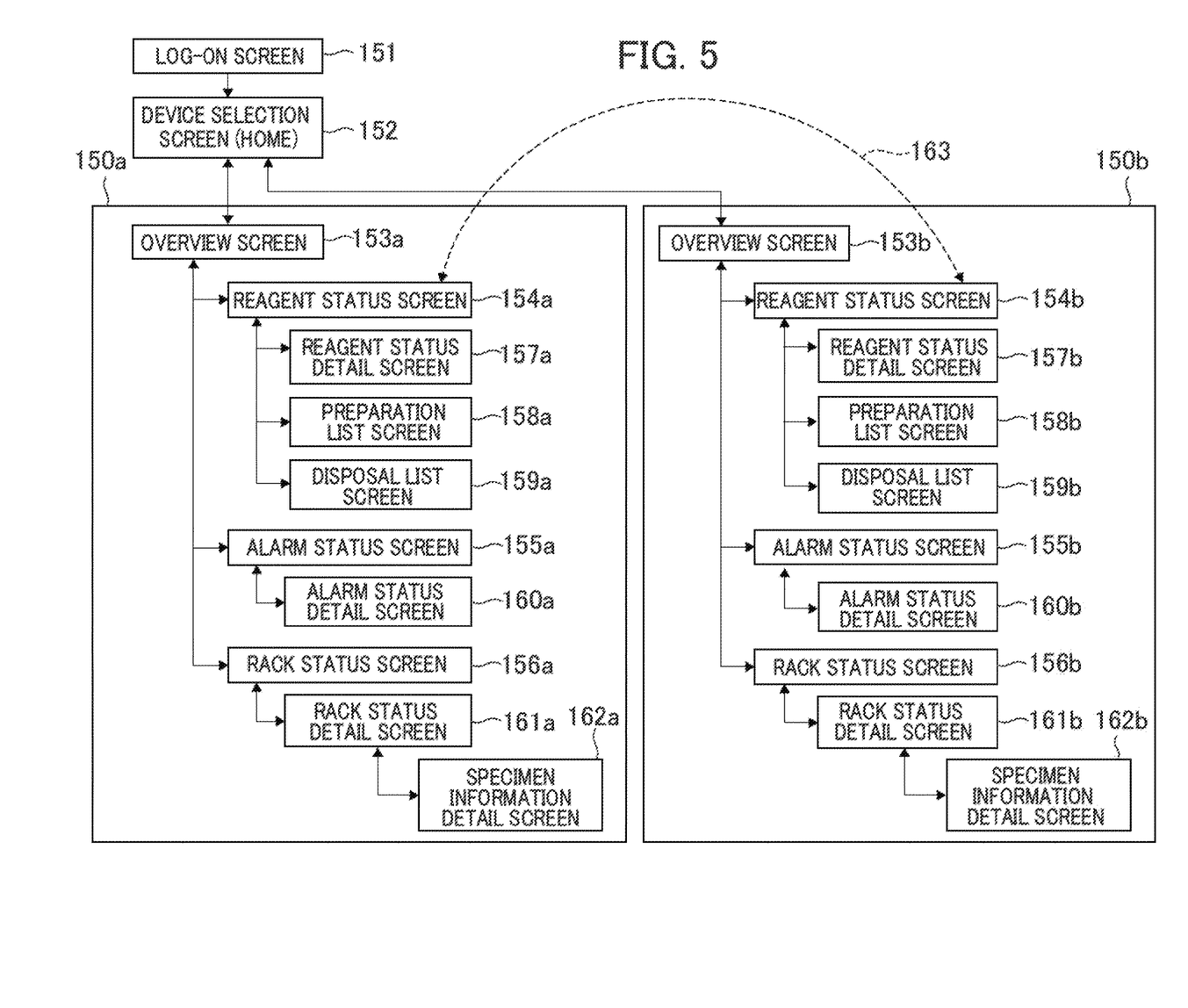
FIG. 5 is an illustration showing an exemplary screen switching transition on a plurality of automatic analyzers displayed on the tablet terminal of the automated analysis system in FIG. 2.

FIG. 5 is an illustration showing an exemplary screen switching transition on a plurality of automatic analyzers displayed on the tablet terminal of the automated analysis system in FIG. 2.

Note that in FIG. 5, the screen transition between reagent status screens the case is taken as an example in which two of four automatic analyzers are connected.

On a screen configuration 150a shown on the left side in FIG. 5, screen elements indicating information on the selected automatic analyzer 101a selected with the device select button on the device selection screen 152. On a screen configuration 150b shown on the right side in FIG. 5, screen elements indicating information on the selected automatic analyzer 101b selected with the device select button on the device selection screen 152.

As shown in the drawing, the user can make the following transitions; the user transitions from a reagent status screen 154a to an overview screen 153a and from the overview screen 153a to the device selection screen 152, presses the device select button for the automatic analyzer 101b from the device selection screen 152 to transition to an overview screen 153b, and transitions from the overview screen 153b to a reagent status screen 154b.

On the other hand, by the above-described operation explained using FIG. 4, the reagent status screen 154a of the automatic analyzer 101a and the reagent status screen 154b of the automatic analyzer 101b can be directly transitioned.

A dotted line denoted by a screen transition 163 shows that the reagent status screen 154a and the reagent status screen 154b can be directly transitioned in two ways. In FIG. 5, the reagent status screens 154a and 154b are taken as examples. However, screen transition can be similarly performed even between the alarm status screens 155a and 155b and between the rack status screens 156a and 156b.

Exemplary Display of the Device Selection Screen

Figure 6:
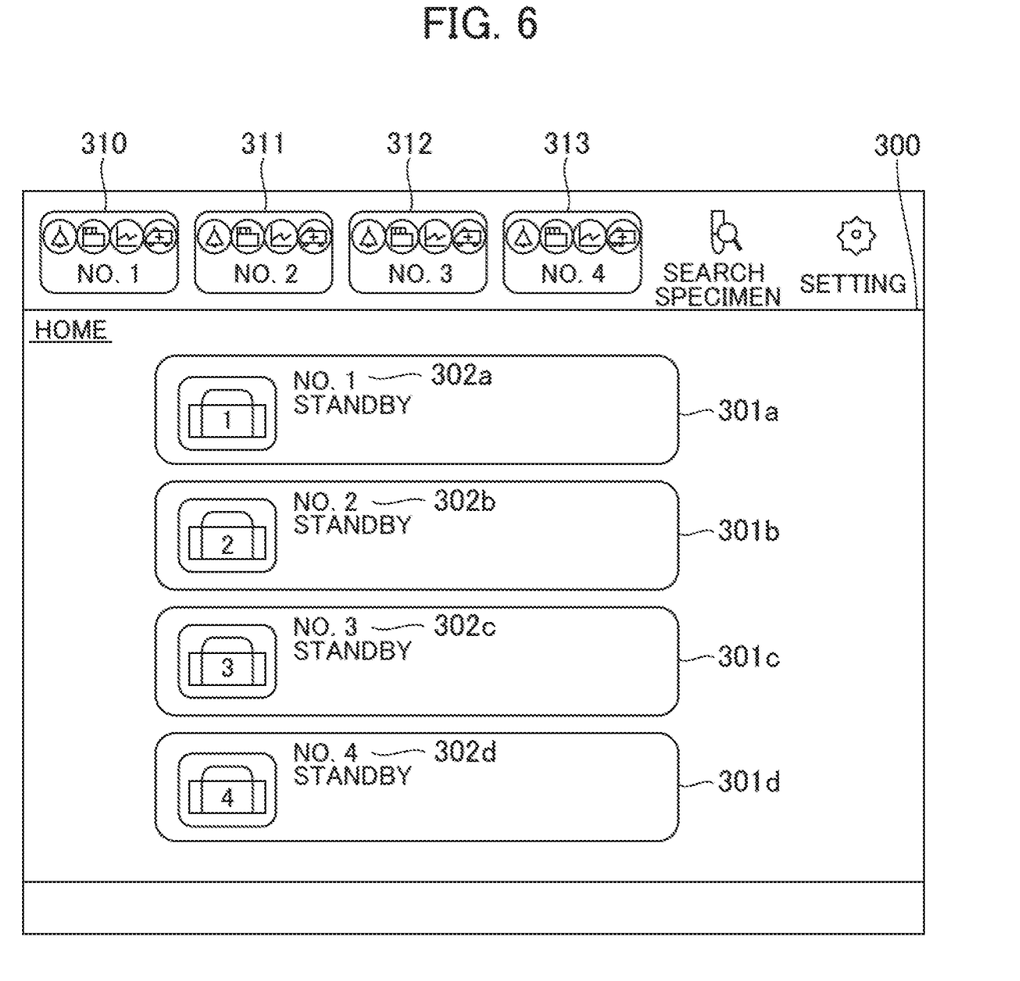
FIG. 6 is an illustration showing an exemplary display of a device selection screen by the tablet terminal of the automated analysis system in FIG. 2.

FIG. 6 is an illustration showing an exemplary display of a device selection screen by the tablet terminal of the automated analysis system in FIG. 2.

As shown in FIG. 6, above the terminal display unit 208, connected device display parts 310, 311, 312, and 313 are displayed from the left side to the right side. Below the connected device display parts 310, 311, 312, and 313, a device selection screen 300 is displayed.

The connected device display parts 310 to 313 are buttons corresponding to the connected automatic analyzer, and indicating which automatic analyzer is connected. For example, in the example in FIG. 6, the state is shown in which four automatic analyzers are connected. For the connected device display parts 310 to 313, the notification icons of the connected automatic analyzers are displayed.

For example, in the connected device display part 310, four types of icons, an alarm notification icon, a sample remaining amount shortage notification icon, a calibration/accuracy management sample measurement termination notification icon, and a measurement termination notification icon for emergency patient samples, are displayed from the left side to the right side. Also for the connected device display parts 311 to 313, similar notification icons are displayed.

On the device selection screen 300, device select buttons 301a, 301b, 301c, and 301d are displayed from above to below. The device select buttons 301a, 301b, 301c, and 301d are displayed corresponding to the connected automatic analyzers on the tablet terminal 114 similarly to the connected device display parts 310, 311, 312, and 313.

As described above, in FIG. 6, since the state is the state in which four automatic analyzers are connected, the device select buttons 301a, 301b, 301c, and 301d corresponding to the automatic analyzers are displayed. This display shows that there are four automatic analyzers that can be connected from the tablet terminal 114 for displaying information.

The device select buttons 301a, 301b, 301c, and 301d respectively indicate device names 302a, 302b, 302c, and 302d, and this enables easily recognizing that which select button corresponds to which automatic analyzer.

For example, in the case in which the device select button 301a is pressed, a main base screen for the automatic analyzer having the device name "No. 1". In the case in which the analyzer having the device name "No. 2" is desired to be connected, the device select button 301b is pressed.

Exemplary Display of the Reagent Status Screen

Figure 7:
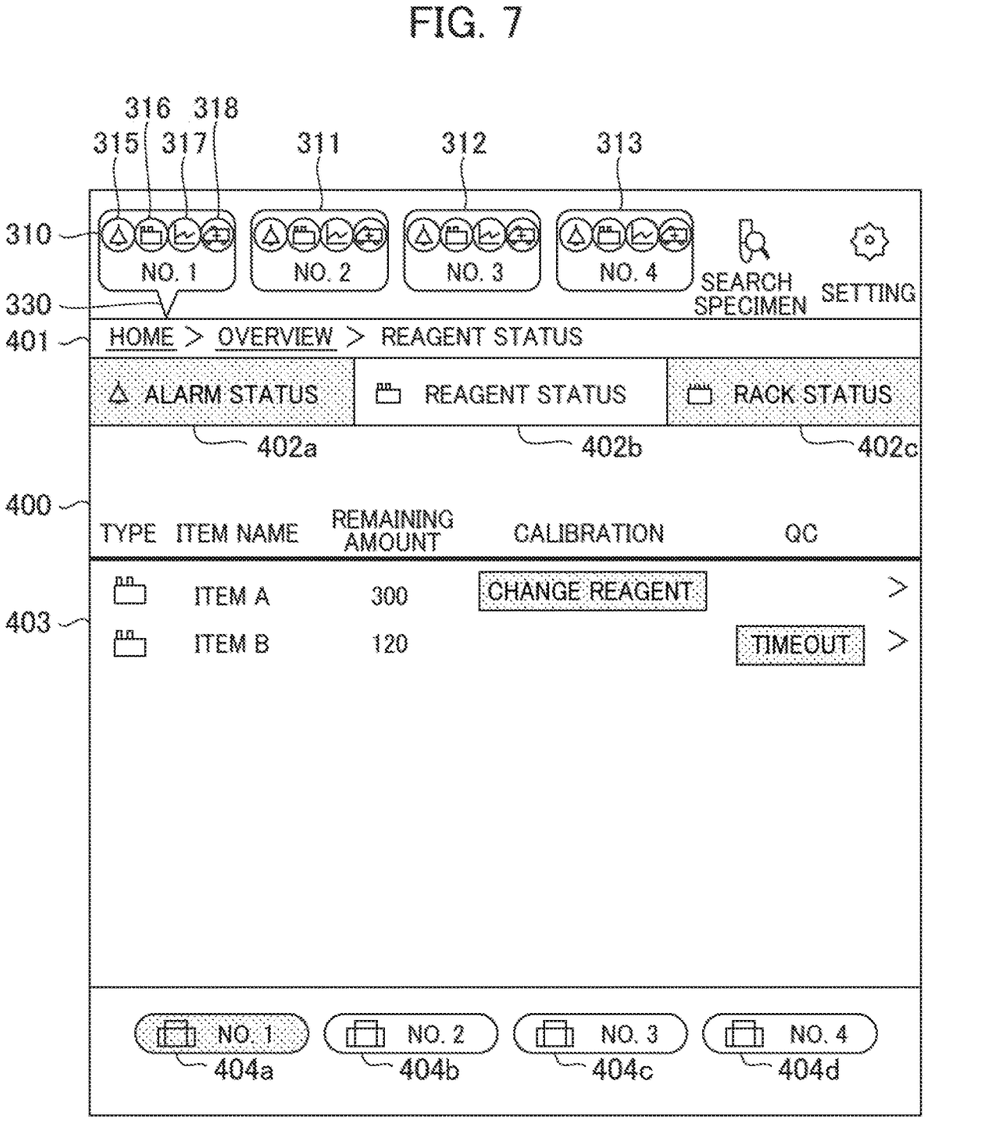
FIG. 7 is an illustration showing an exemplary display of a reagent status screen by the tablet terminal of the automated analysis system in FIG. 2.

FIG. 7 is an illustration showing an exemplary display of a reagent status screen by the tablet terminal of the automated analysis system in FIG. 2.

As shown in FIG. 7, a reagent status screen 400 that is a status confirmation screen is displayed below the connected device display parts 310, 311, 312, and 313. Above this reagent status screen 400, a hierarchy display list 401 is displayed, and below the hierarchy display list 401, screen transition tabs 402a, 402b, and 402c are displayed.

Below the screen transition tabs 402a, 402b, and 402c, a reagent information display list 403 is displayed, and below the reagent information display list 403, device switch buttons 404a, 404b, 404c, and 404d are displayed.

Similarly to FIG. 6, on the connected device display parts 310, 311, 312, and 313, four types of icons, an alarm notification icon 315, a sample remaining amount shortage notification icon 316, a calibration/accuracy management sample measurement termination notification icon 317, and a measurement termination notification icon 318 for the emergency patient sample, are displayed.

For example, four types of icons displayed on the connected device display part 310 show notification in "No. 1" automatic analyzer, and four types of icons displayed on the connected device display part 311 show notification in "No. 2" automatic analyzer.

Four types of icons displayed on the connected device display part 312 show notification in "No. 3" automatic analyzer, and four types of icons displayed on the connected device display part 313 show notification in "No. 4" automatic analyzer.

The display status of the icons 315 to 318 tell alarm notification, sample remaining amount shortage notification, calibration/accuracy management sample measurement termination notification, and measurement termination notification for an emergency patient sample, and any other notification.

Below the connected device display parts 310 to 313, a device corresponding mark 330 indicating that the displayed reagent status screen shows the status of which automatic analyzer is displayed. In the example in FIG. 7, the reagent status screen for "No. 1" automatic analyzer is shown, and as the device corresponding mark 330, a balloon part is displayed below the connected device display part button 310 indicating "No. 1" automatic analyzer.

Note that the device corresponding mark 330 is not limited to the balloon shown in FIG. 7. Any mark may be fine, which can discriminate that the displayed reagent status screen shows the status of which automatic analyzer.

As described above, the connected device display parts 310, 311, 312, and 313 are provided with the device corresponding mark 330, such as a balloon part, showing the automatic analyzer in the displayed reagent status screen, and hence it can be visually discriminated that the displayed reagent status screen displays the status of which automatic analyzer in a plurality of automatic analyzers.

The hierarchy display list 401 is a list that indicates the hierarchical structure of the screen, indicating that the present displayed screen is the screen below which screen hierarchy. In the example in FIG. 7, "home" at the left end indicates the top-layer screen of the hierarchy, and "reagent status" at the right end indicates the screen presently displayed.

The screen transition tab 402a is selected, and makes transition to the alarm status screen. The screen transition tab 402b is selected, and can make transition to the reagent status screen, and the screen transition tab 402c is selected, and can make transition to the rack status screen.

The reagent information display list 403 displays information on the reagents installed on the target automatic analyzer. In the example in FIG. 7, the installed reagents are item A and item B, each showing the remaining amount.

In addition to this, "reagent exchange" that notifies the operator to perform calibration analysis, and "timeout" that notifies the operator to perform control sample analysis/analyze, for example, are displayed.

The device switch buttons 404a, 404b, 404c, and 404d are device switch buttons corresponding to the automatic analyzer connected to the tablet terminal 114. In FIG. 7, the device switch buttons 404a, 404b, 404c, and 404d are displayed.

This shows that there are four automatic analyzers that can be switched from the tablet terminal 114.

The device switch button corresponding to the displayed automatic analyzer is displayed distinguishing from the device switch button for the automatic analyzer that is not displayed. In the example in FIG. 7, the displayed automatic analyzer 404a corresponding to the device switch button is displayed such that the background color and text color in the button are different from the other device switch buttons 404b to 404d.

The device switch buttons 404a to 404d are to be always displayed, even though the screen transitions from the reagent status screen in FIG. 7, for example, to the alarm status screen, or to the rack status screen. Thus, even though any screen is displayed, the automatic analyzer can be switched to the other automatic analyzers.

For example, the device switch button 404b is pressed, and the reagent status screen for "No. 2" automatic analyzer is displayed. As described above, the operation of pressing the device switch button corresponding to the automatic analyzer can transition between the same screens.

Exemplary Transition of the Reagent Status Screen

Figure 8:
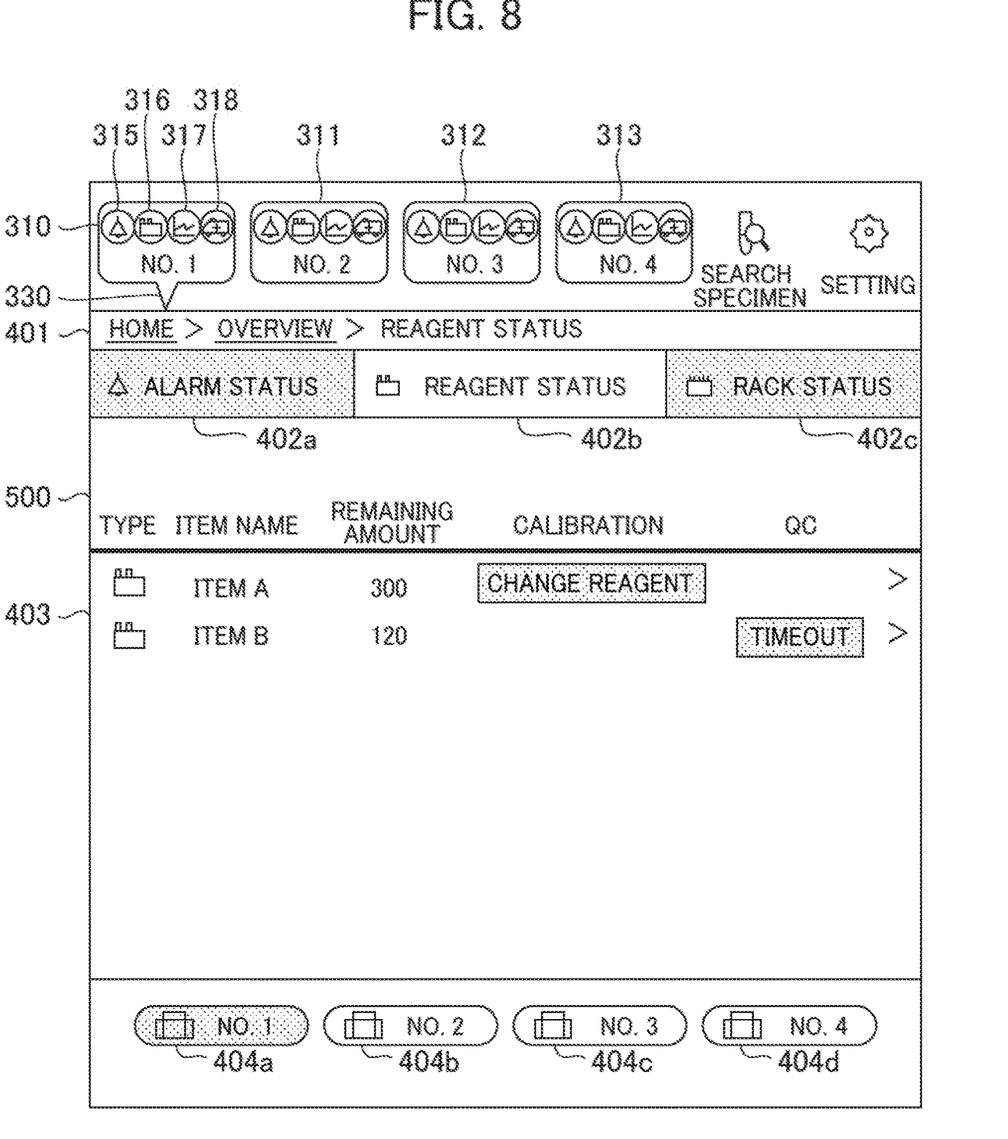
FIG. 8 is an illustration showing an exemplary screen display before switching the screen of the reagent status screen by the tablet terminal of the automated analysis system in FIG. 2.

FIG. 8 is an illustration showing an exemplary screen display before switching the screen of the reagent status screen by the tablet terminal of the automated analysis system in FIG. 2.

FIG. 8 shows an exemplary screen in which in a reagent status screen 500 that is a status confirmation screen, the reagent status information on the device name "No. 1" is displayed, showing the state before the device is switched.

The background color and text color in the device switch button 404a are distinguished from the background color and text color in the other device switch buttons, and this shows that reagent status information on the device name "No. 1" is displayed. The reagent status screen displays reagent status information on the device name "No. 1" also with the device corresponding mark 330 shown by the balloon part below the connected device display part 310.

The reagent information display list 403 in FIG. 8 displays information on reagent item A and reagent item B mounted on the device name "No. 1".

Subsequently, the reagent status screen will be described after the device switch button 404b is pressed from the screen status shown in FIG. 8.

Figure 9:
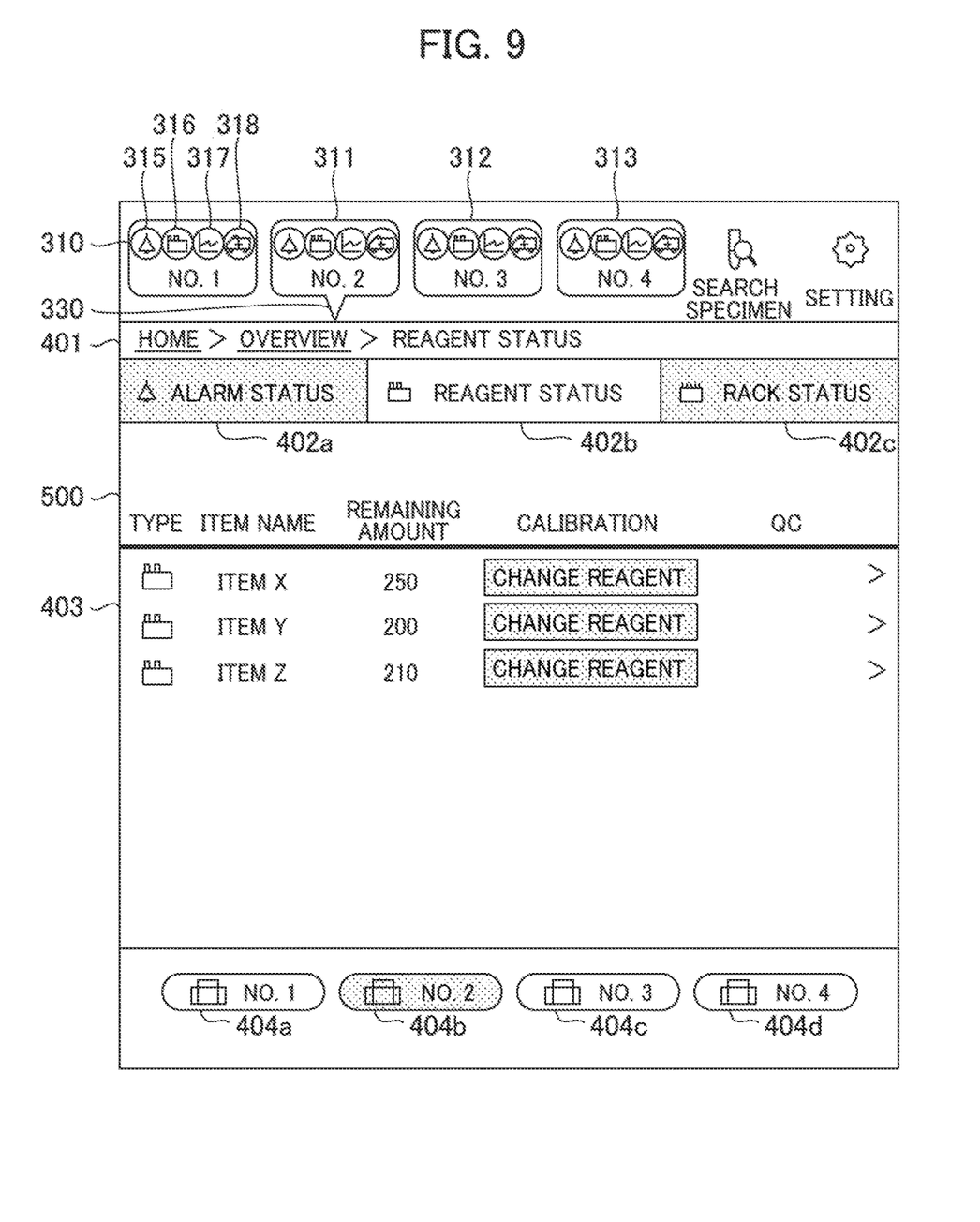
FIG. 9 is an illustration showing an exemplary screen display after switching the screen of the reagent status screen in FIG. 8.

FIG. 9 is an illustration showing an exemplary screen display after switching the screen of the reagent status screen in FIG. 8.

The reagent status screen 500 shown in FIG. 9 is an exemplary screen displaying reagent status information on the device name "No. 2", showing an exemplary display after the device is switched.

The device switch button 404b is pressed, and the background color and text color in the button are switched between the device switch button 404a and the device switch button 404b. Thus, it is shown that reagent status information on the automatic analyzer having the device name "No. 2" is displayed.

At this time, the device corresponding mark 330 that is a balloon is displayed below the connected device display part 311 from the connected device display part 310. Thus, it can be discriminated that the reagent status screen 500 displays reagent status information on the automatic analyzer having the device name "No. 2".

In FIG. 9, the reagent information display list 403 displays information on reagent item X, reagent item Y, and reagent item Z mounted on the automatic analyzer having the device name "No. 2". Note that in the case in which it is desired to return to "No. 1" automatic analyzer, the device switch button 404a is pressed.

As described above, the device switch buttons 404a to 404d that are given device switch buttons are selected using the tablet terminal 114, and hence the same work status a plurality of automatic analyzers 101a to 101d can be easily confirmed for a short time.

Thus, the number of man-hours in confirmation, for example, can be reduced, and working efficiency can be improved.

As described above, the invention made by the present inventors is more specifically described based on the embodiment. However, the present invention is not limited to the embodiment, and it is without saying that the present invention can be modified variously in the scope not deviating from the gist of the invention.

Note that the present invention is not limited to the foregoing embodiment, and includes various exemplary modifications. For example, the foregoing embodiment is described in detail for easily understanding the present invention, and the invention is not necessarily limited to ones having all the described configurations.

A part of the configuration of an embodiment can be replaced with the configuration of the other embodiment, and the configuration of the other embodiment can also be added to the configuration of an embodiment. A part of the configuration of each embodiment can be added with, removed from, and replaced from the other configurations.

REFERENCE SIGNS LIST

100: automated analysis system,
101: automatic analyzer,
102: sample container,
103: sample rack,
104: sample input unit,
105: transfer line,
106a: analysis unit,
106b: analysis unit,
106c: analysis unit,
107: reagent container, 108a: reagent disk,
108b: reagent disk,
108c: reagent disk,
109: sample housing unit,
110: communication device,
113: wireless device,
114: tablet terminal,
120a: reaction disk,
120b: reaction disk,
120c: reaction disk,
121a: sample dispensing mechanism,
121b: sample dispensing mechanism,
121c: sample dispensing mechanism,
122a: reagent dispensing mechanism,
122b: reagent dispensing mechanism,
122c: reagent dispensing mechanism,
123a: photometric mechanism,
123b: photometric mechanism,
123c: photometric mechanism,
130: communication device,
200: operator,
201: input unit,
202: display unit,
204: device information management unit,
205: information management purpose PC communication unit,
206: storage unit,
207: analysis unit purpose communication unit,
208: terminal display unit,
209: terminal communication unit,
210: terminal information management unit,
211: terminal input unit,
221: alarm management unit,
222: reagent management unit,
223: measurement termination management unit,
224: user management unit,
231: information management communication unit,
232: information management unit,
233: information management storage unit

The invention claimed is:

1. An automated analysis system comprising:
a plurality of automatic analyzers configured to measure a specimen; and
a terminal device connected to the plurality of the automatic analyzers,
wherein: the terminal device has
an information management unit configured to acquire device information showing state status of an automatic analyzer from the plurality of the automatic analyzers and generate a status confirmation screen showing device status of the automatic analyzer based on the acquired device information, and
a display unit configured to display the status confirmation screen generated by the information management unit;
the status confirmation screen displayed on the display unit has
the status information screen showing the device status of the automatic analyzer of the plurality of the automatic analyzers, and
a switch button configured to switch the status information screen to a status information screen corresponding to another automatic analyzer; and
in response to determining that the switch button is selected, the information management unit generates the status confirmation screen showing device status of the another automatic analyzer based on the device information on the another automatic analyzer corresponding to the selected switch button, and displays the status confirmation screen on the display unit.

2. The automated analysis system according to claim 1, wherein the switch button displayed on the display unit is displayed corresponding to each of the plurality of the automatic analyzers.

3. The automated analysis system according to claim 2, wherein the switch button displayed on the display unit is displayed so that the switch button corresponding to a displayed automatic analyzer is discriminated from the switch button corresponding to an automatic analyzer not displayed.

4. The automated analysis system according to claim 1, wherein the status confirmation screen displayed on the display unit has a hierarchical structure having a first sort display sorted for each status and a second sort display sorting the first sort display.

5. The automated analysis system according to claim 1, wherein: the status confirmation screen displayed on the display unit displays a connected device display part showing an automatic analyzer connected to the terminal device; and
the connected device display part displays a device corresponding mark showing that the status confirmation screen displayed on the display unit displays status of which automatic analyzer.

6. The automated analysis system according to claim 4, wherein when the first sort display corresponding to the automatic analyzer that is a given automatic analyzer is displayed on the display unit, after the automatic analyzer that is another automatic analyzer is selected through a device select screen displayed on the display unit, the information management unit switches such that the first sort display corresponding to the selected automatic analyzer is displayed on the display unit.

7. The automated analysis system according to claim 6, wherein the first sort display displayed on the display unit is at least any of a reagent status screen, an alarm status screen, and a rack status screen.

8. The automated analysis system according to claim 6, wherein when the first sort display is displayed on the display unit, the information management unit always displays the device select screen on the display unit.

* * * * *